(12) United States Patent
Brausen

(10) Patent No.: US 10,324,437 B2
(45) Date of Patent: Jun. 18, 2019

(54) ELECTRICAL SYSTEM MONITORING AND CONTROL DEVICE

(71) Applicant: Dan Brausen, Little Canada, MN (US)

(72) Inventor: Dan Brausen, Little Canada, MN (US)

( * ) Notice: Subject to any disclaimer, the term of this patent is extended or adjusted under 35 U.S.C. 154(b) by 120 days.

(21) Appl. No.: 15/479,421

(22) Filed: Apr. 5, 2017

(65) Prior Publication Data

US 2017/0315525 A1 Nov. 2, 2017

Related U.S. Application Data

(60) Provisional application No. 62/328,250, filed on Apr. 27, 2016.

(51) Int. Cl.
*G05B 19/04* (2006.01)
*G05B 19/042* (2006.01)
*G05B 15/02* (2006.01)
*H02B 1/03* (2006.01)
*G06F 1/28* (2006.01)

(52) U.S. Cl.
CPC .... *G05B 19/042* (2013.01); *G05B 2219/2642* (2013.01)

(58) Field of Classification Search
CPC ..... G05B 15/02; G05B 19/0425; G06F 1/189; G06F 1/28
USPC .................................................. 700/286, 295
See application file for complete search history.

(56) References Cited

U.S. PATENT DOCUMENTS

| 7,099,785 B2 | 8/2006 | Lee et al. |
| 7,539,548 B2 | 5/2009 | Dhawan |
| 8,310,370 B1 | 11/2012 | Williams et al. |
| 2010/0145542 A1 | 6/2010 | Chapel et al. |
| 2011/0230982 A1* | 9/2011 | Lee ........................ G05B 15/02 700/83 |
| 2013/0271111 A1 | 10/2013 | Makanawala |
| 2013/0297087 A1* | 11/2013 | Koster ..................... H04Q 9/00 700/291 |
| 2014/0233160 A1 | 8/2014 | Ferri et al. |

* cited by examiner

*Primary Examiner* — Michael J Brown
(74) *Attorney, Agent, or Firm* — Global Intellectual Property Agency, LLC; Daniel Boudwin

(57) ABSTRACT

A device for monitoring and controlling an electrical system. The device has a control unit which attaches to a building's electrical system. The control unit includes a sensor attached to each circuit of the electrical system, wherein the sensor can detect characteristics of the circuit and transmit the data to a computer. The computer can analyze the data to check for fault states and other anomalies as well as monitor overall performance of the electrical system. The computer can disable electricity from reaching the circuit when a fault condition is detected via the sensor. Further, the data can be transmitted to a display in order to provide status updates and recommendations to a user. The status of each of the building's circuit is displayed and a user may test or reset any circuit via an interface with the display or a mobile electronic device.

11 Claims, 4 Drawing Sheets

ELECTRICAL SYSTEM MONITORING AND CONTROL DEVICE

CROSS REFERENCE TO RELATED APPLICATIONS

This application claims the benefit of U.S. Provisional Application No. 62/328,250 filed on Apr. 27, 2016. The above identified patent application is herein incorporated by reference in its entirety to provide continuity of disclosure.

BACKGROUND OF THE INVENTION

The present invention relates to electrical system monitoring and control devices.

Circuit breakers and fuses are the sole control interface and monitoring equipment most buildings have, especially homes. However, the circuit breakers and fuses are unable to monitor the current state of the system, provide maintenance reminders, or monitor for inefficiencies or anomalies within the building. Furthermore, circuit breakers are known to have a high failure rate, which can result in injury to people or damage to property such as electrical failures, fires, and damage to or destruction of appliances and electronics. When circuit breakers are operational, each breaker may be triggered to turn off an important circuit when a homeowner is away. Sometimes these circuits may need to be reset, but the homeowner is unable to do so. One such time is when an owner is on vacation but the circuit controlling a pet's water fountain, or a fish tank's aerator and filter are tripped causing them to remain unpowered until the owner's return. Another is when a child is left in the care of a grandparent who may injure themselves attempting to reset a circuit breaker because the lights went out.

Commonly missed electrical anomalies and problems in a building include faults to ground, loose wiring connections, frayed wiring and/or defective switching components, voltage spikes and surges. Due to the limited nature of circuit breakers they are unable to diagnose these problems and even when they do trigger and mechanically sever the circuit, the circuit breakers are unable to gather and store information as to what caused the issue. Furthermore, circuit breakers are unable to provide information or recommendations as to what improvements may be made to a building's electrical system. Therefore, there exists a need for a device which can monitor and control the electrical system of a building, provide recommendations and allow for remote testing and resetting of the buildings circuits.

SUMMARY OF THE INVENTION

In view of the foregoing disadvantages inherent in the known types of electrical system monitoring and control devices now present in the prior art, the present invention provides in one embodiment an electrical system monitoring and control device with a control unit attached to the electrical system of a building which has a built in display, computer, memory, and sensor(s) and allowing the sensor to detect characteristics of the electrical system, and pass the information along to the computer and memory. The memory stores the data received and the computer analyzes the data before the instructing the display to show each circuit and its status, and possibly disable a circuit via electronic switching circuitry, as well as allowing a human user to test and reset said circuit. Wherein, the same can be utilized for providing convenience for the user when interacting with the electrical system of a building.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
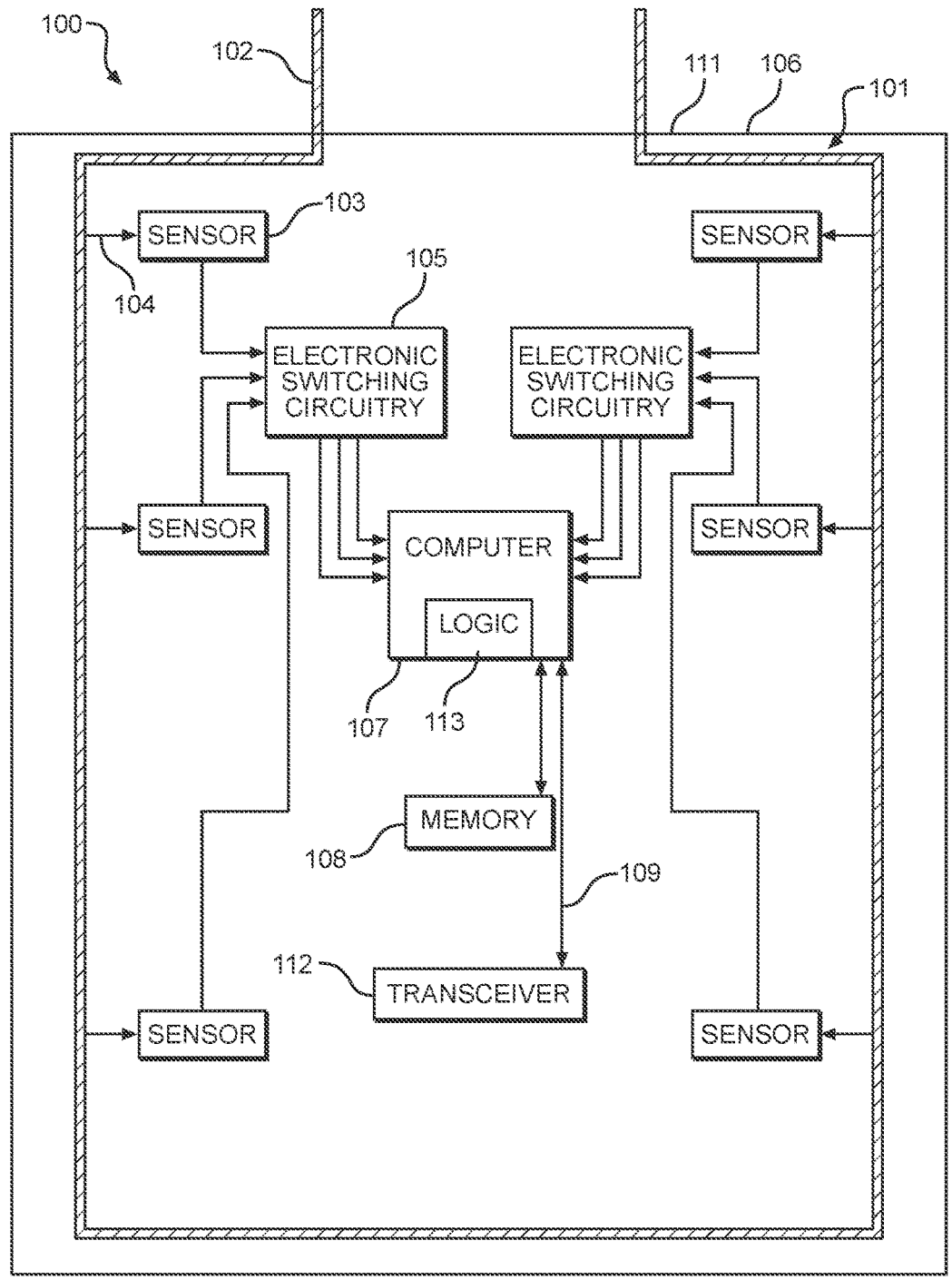
FIG. 1 shows a diagram of a first embodiment of the electrical system monitoring and control device.

Reference is made herein to the attached drawings. Like reference numerals are used throughout the drawings to depict like or similar elements of the electrical system monitoring and control device. The figures are intended for representative purposes only and should not be considered to be limiting in any respect.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

In the interests of economy, the present disclosure refers to "a computer-readable medium," "a processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure.

Referring now to FIG. 1, there is shown a diagram of a first embodiment of the electrical system monitoring and control device 100. The electrical system monitoring and control device 100 includes a control unit 101 attached to the electrical system of a building 102. This control unit 101 has one or more sensors 103 attached to each circuit 104 of the electrical system of the building 102 and electronic switching circuitry 105 attached to each circuit 104 of the electrical system of the building 102. The electronic switching circuitry 105 can disable electricity from reaching the attached circuit 104 of the electrical system of the building 102 when a fault condition is detected via a sensor 103.

The control unit 101 comprises a computer 107 that is operably connected to each sensor 103. In the illustrated embodiment, the sensor is a current sensor. Each sensor 103 is configured to detect characteristics of the corresponding circuit 104 of the electrical system of the building 102 and transmit the resulting data via the bus 109 to the computer 107 which stores the data in a memory unit 108 and analyzes the data to check for fault states and other anomalies as well as to monitor overall performance.

In the illustrated embodiment, the characteristics detected by a sensor 103 include: voltage, amperage, temperature, and the wave shape of the detected current. Characteristics of the electrical system of the building 102 that may be detected by a sensor 103 in other embodiments can include voltage, amperage, the wave shape of the sensed current, wattage, temperature, ohms, teslas, webers, coulombs, amperes per meter, electrical reactance, electromagnetic fields, and possibly others depending on the embodiment. Furthermore, in other embodiments, sensors 103 can vary in sensitivity, range of characteristics detected, and even in the number of sensors 103 on a single circuit 104.

The computer 101 embodies a logic 113, which is stored, e.g., on a non-transitory computer readable medium, and executed at least in part by a processor. As used herein, "logic" refers to (i) logic implemented as computer instructions and/or data within one or more computer processes and/or (ii) logic implemented in electronic circuitry. The computer 101 is further operably connected to a display unit 106 and the electronic switching circuitry 105 such that the computer 101 can cause the display unit 106 to display the status of each circuit 104 thereon, e.g., detecting a fault condition, via transmitting electronic commands.

The computer 107 continuously monitors various characteristics associated with the electrical system of the building 102 via the sensors 103 and stores the data in the memory unit 108. The data stored includes a predetermined set of characteristics of an ideal default electrical carrier wave. The logic 113 of the computer 107 continuously compares the stored data with newly detected data, and with pre-determined ranges of possible values for the measured characteristics. When the comparison determines one or more of the characteristics is outside the acceptable range of possible values, then one or more actions are taken such as providing recommendations to a user via the display unit 106, and shutting down power to a circuit 104. In the illustrated embodiment, situations that are detected via analysis of these characteristics via the logic 113 include a fault to ground, over amperage, arcing in a circuit, or capacitive or inductive loads.

For example, if a fault is detected by the sensor 103, the logic 113 of the computer 107 transmits a command via the bus 109 to the electronic switching circuitry 105 to shut off electricity to the corresponding circuit 104. The computer is configured to then send a notification to the display unit 106, and the transceiver 112 identifying the circuit 104 that was affected and the reason electricity was prevented from being supplied thereto. After sending a notification, or in the absence of a fault being detected, the logic 113 of the computer 107 determines which pre-determined recommendations regarding the electrical system of a building 102 are applicable based on the range of values the characteristics fall into. The set of pre-determined recommendations includes a "null" recommendation, null meaning that it is (i) an empty character string or (ii) a recommendation that nothing needs to be done, this recommendation is used when the circuit 104 is operating within the range of acceptable values. The logic 113 of the computer 107 then has the display unit 106 display each circuit 104 and the status of each circuit 104 as well as the recommendations. In other embodiments, the logic 113 may also have the transceiver 112 transmit information to a server where the information would be retrievable via a website, software application, or application program interface. Recommendations can vary significantly such as suggested maintenance of devices on particular circuits 104, to asking for permission to conduct virtual switching operations to correct for capacitive or inductive loads.

Figure 2:
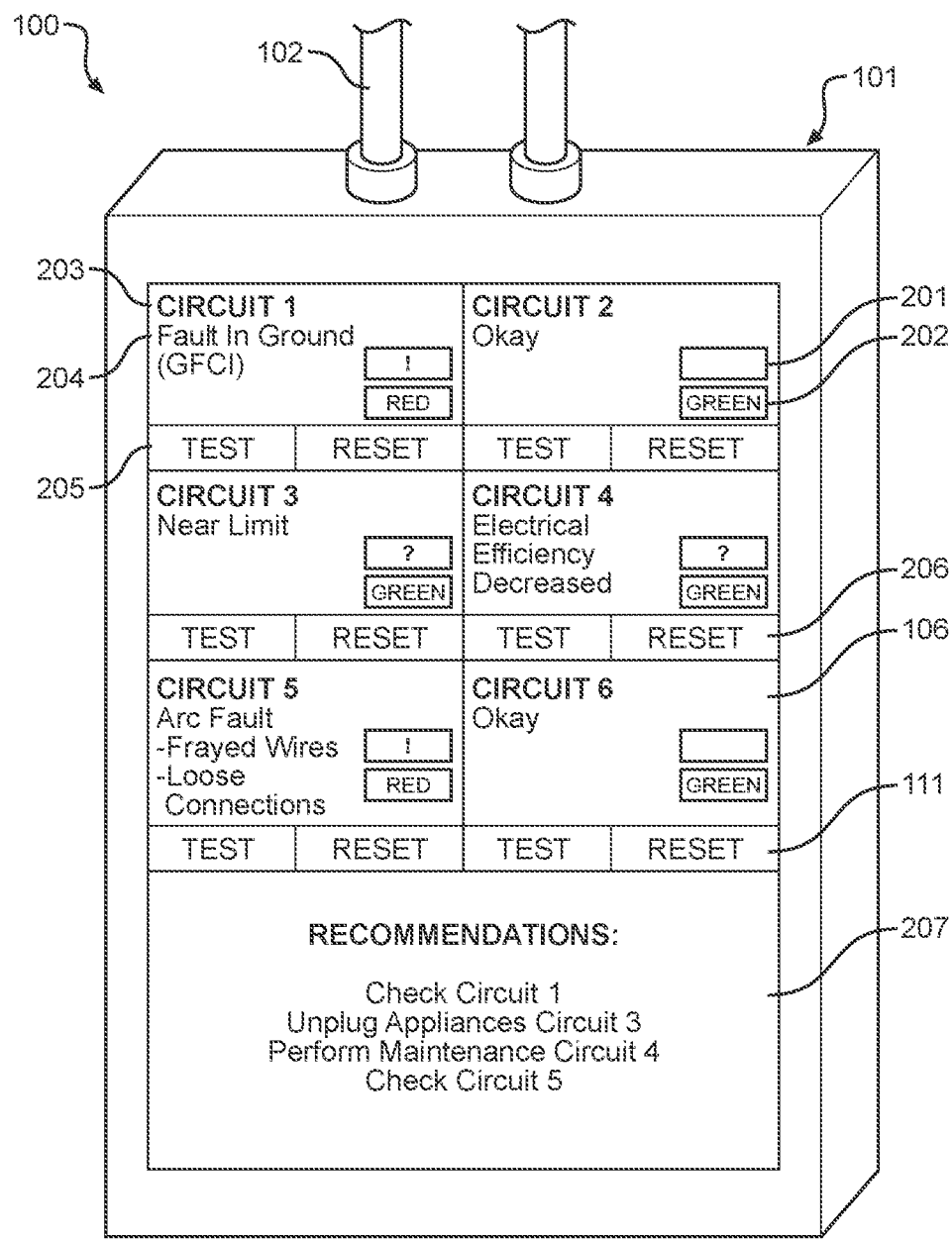
FIG. 2 shows a perspective view of a first embodiment of the electrical system monitoring and control device.

Referring now to FIG. 2, there is shown a perspective view of a first embodiment of the electrical system monitoring and control device. In the illustrated embodiment, the display unit 106 displays a representation of each circuit within the electrical system of a building 102 via a circuit display 203. The circuit display 203 is adjacent to a status display 201, wherein the status display 201 indicates the status of each circuit. In the illustrated embodiment, the status display 201 comprises a symbol, such as question mark or exclamation mark, that indicates to a user the electrical system needs service. The question mark indicates the device has a recommendation to provide the user and the exclamation mark indicates electricity is not being supplied to a circuit. In the illustrated embodiment, if the status display 201 is empty or blank, the electrical system is performing within the normal range of measurable characteristics. In alternate embodiments, any suitable graphical user interface can be used within the status display 201 for indicating to a user the status of circuits within the electrical system.

In the illustrated embodiment, a status explanation display 204, positioned adjacent to the circuit display 203, is configured to provide a visual explanation for the symbol of the status display 201. The provided explanation of a status of the status display 201 is determined by a comparison of the data detected by the sensor to one or more pre-determined ranges of values, as well as previously recorded and stored data. Adjacent to the status explanation display 204 and the status display 201 is a quick view display 202. In the illustrated embodiment, the quick view display 202 uses a color signifier to quickly draw attention to a problem area or circuit. The quick view display 202 comprises a green color signifying the circuit is performing within the normal range of measurable characteristics, a yellow color signifying the device has a recommendation to provide the user, or red color signifying electricity is not being supplied to a circuit.

The display unit 106 comprises an input 111 to allow a user to interface with the device 100 to test and reset each circuit. In this embodiment, the display unit 106 and input 111 are a touchscreen. The display for each circuit has its own interactive test icon 205 and interactive reset icon 206. When activated via the interface, the interactive test icon 205 triggers a test of the ground fault circuit interrupter for that circuit. If the circuit is functioning incorrectly the circuit is interrupted and the flow of electrical power to that circuit is stopped, requiring the pushing of the interactive reset icon 206 to re-activate the flow of power to that circuit 104. It is generally recommended for ground fault circuit interrupters to be tested for each circuit 104 once a month to ensure the ground fault circuit interrupters are functioning correctly. In other embodiments, the display unit 106 and input 111 are a monitor and keyboard or augmented reality headset or any other device or combinations of device which may be obvious to one of ordinary skill in the art.

In some embodiments, the display unit 106 is configured to inform a user that there are recommendations regarding the electrical system of a building 102 and allow these recommendations to be viewed on the display unit 106. Other embodiments allow for the changing of settings regarding when to break a circuit or what conditions would trigger an alert or recommendation. For example, the default power would shut off to a circuit 104 when the sensor 103 detects the amperage is equal to or greater than twenty amps, but out of an abundance of caution a user wishes to reduce that range and does so through the input 111 and the logic 113 by creating a custom range of values, zero to eighteen amps, and specifies that the action to be taken when the sensor 103 detects amperage outside of that range is to shut off power to that circuit.

In some embodiments, the input 111 allows a user to signal to the computer 107 that a new electrical device is being added to a circuit 104. The logic 113 then requests via the computer 107 and display unit 106 that the user provide an identifier for the new electrical device via the input 111. The identifier is a name for the new electrical device connected to the circuit comprising an alphanumerical sequence, it is chosen by the user. For example, "toaster", "PC 3", or "12-01". Once the identifier has been provided by the user via the input 111, the logic 113 will ask the user via the display unit 106 to indicate via the input 111 when the user is ready to commence the detection period. The detection period is a pre-determined interval of time during which the computer 107 directs the sensor 103 to detect measurable characteristics of the circuit 104. During this time the user connects the new electrical device to the circuit 104.

The computer 107 stores the measurements in the memory unit 108 and the logic 113 compares the new measurements wherein the new electrical device is connected to the circuit, to previously recorded measurements wherein the new electrical device was not connected to the circuit. By analyzing the difference in measurements from before the new electrical device was connected to the circuit to the measurements taken during the pre-determined detection period wherein the new electrical device is connected, the logic 113 is able to discern the measurable characteristics of the new electrical device. The logic 113 then assigns the discerned measurable characteristics to the identifier and stores the measurable characteristics in the memory unit 108.

At pre-determined intervals, the logic 113 will direct the sensor 103 to detect measurable characteristics of the circuit 104 on an ongoing basis. When the sensor 103 detects the measurable characteristics of the circuit 104, the logic 113 is able to analyze the measurable characteristics that have been detected to determine if an electrical device with an identifier is in use. When an electrical device with an identifier is in use, the logic 113 records in the memory unit 108 the measurable characteristics attributable to the electrical device, and the current time and date as a characteristic of the identifier. The logic 113 compares the newly recorded measurements against past measurements and determines if there is an applicable recommendation. When there is an applicable recommendation the logic 113 will inform the user via the display unit 106. In some embodiments, a user can either transmit the recorded information to a remote electronic device, such as a smart device, or direct the information via the input 111 to display the recorded characteristics of an identifier on the display unit. In some embodiments, the information on the display unit is shown in the form of a number such as average amperage over time. In other embodiments, the information displayed is a chart of usage over time represented as a line plotted on a graph and a recommendation based on the measurable characteristics.

Figure 3:
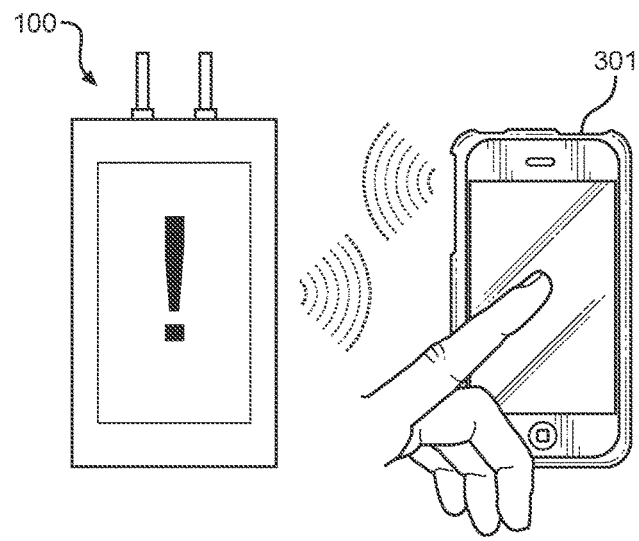
FIG. 3 shows a diagram of an electrical system monitoring and control device transmitting information to and then receiving commands from a user.

Referring now to FIG. 3, there is shown a diagram of an electrical system monitoring and control device transmitting information to and then receiving commands from a user. In the illustrated embodiment, the control unit 101 comprises a transceiver 112 (as seen in FIG. 1) for sending communications to a user and receiving communications from a remote device 301. The transceiver is configured to transmit and receive messages via a telecommunications network, such as the internet, cellular network, or phone lines, or may transmit via radio or any other method which may be obvious to one of ordinary skill in the art. Some embodiments include a remote device 301 adapted to transmit instructions or commands to the logic of the computer to execute. For example, the remote device 301 may communicate to the control unit 101 to test or reset a circuit 104, or conduct a diagnostic on the electrical system of a building 102. This way a homeowner may communicate with the control unit 101 via a cell phone, website, or remote computer program. In other embodiments, the control unit 101 can update a website that displays its status or update a data center.

Figure 4:
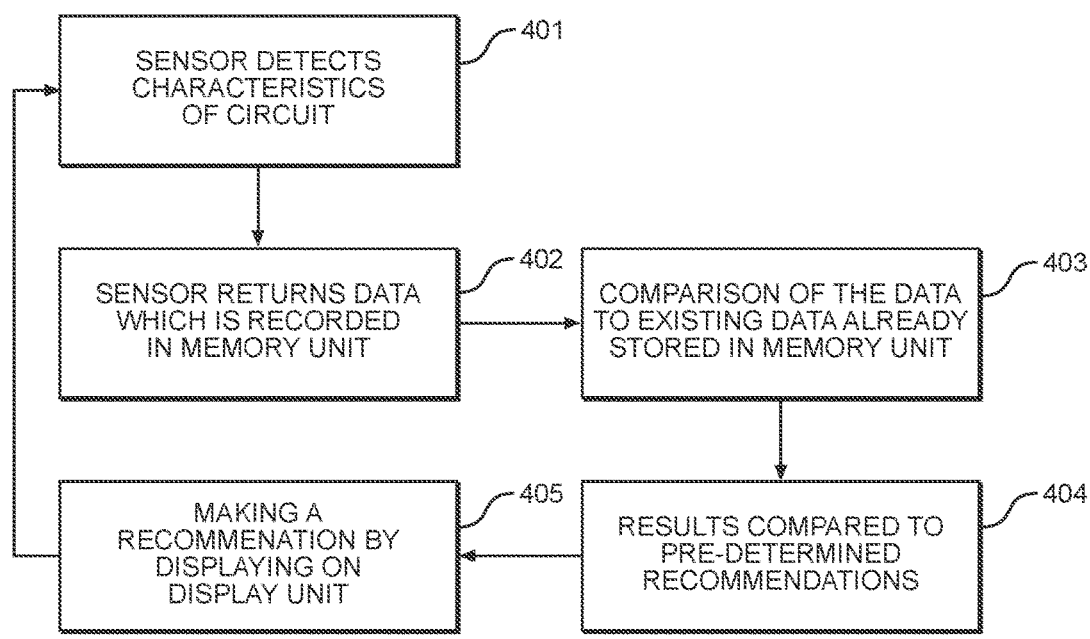
FIG. 4 shows a flowchart of a method for making recommendations regarding an electrical system.

Referring now to FIG. 4, there is shown a flowchart of a method for making recommendations regarding an electrical system. The method for making recommendations to a user based on the characteristics of an electrical system of a building includes a step of a sensor detecting characteristics of a circuit of the electrical system of a building 401. The sensor sends the data detected to the computer to be stored in a memory unit 402. The computer then compares the data detected to existing data already stored in a memory unit 403 including previously measured data and ranges of ideal values for measurable characteristics. Based on the results of the comparison, one or more pre-determined recommendations are found to be applicable from the set of pre-determined recommendations 404. The computer then takes the action of making a recommendation by displaying it on a display unit 405. These steps are within an infinite loop so that immediately following the step of making a recommendation by displaying it on a display unit 405 the next step would be the sensor 103 detecting characteristics of a circuit 104 401.

For example, in a first embodiment of this method a computer monitors the changes in a load in a circuit over time. This circuit has a refrigerator plugged into it and as the refrigerator ages the motor/compressor wears and begins drawing more current. It also has to work harder the dirtier it gets, both of which would show as a gradual increase in power consumption during typical operation. This information is recorded, monitored, and analyzed over time. The information is then compared to anticipated performance stored in the computer's memory unit which will notify owners of the need for service to correct the anomalous condition. Collectively, this improved timely maintenance will result in energy savings.

In a second embodiment of this method, a computer 107 monitors capacitive or inductive load in a circuit in order to correct for the power factor an electric meter reads to reflect the "true power" being consumed. Inductive loads may occur when a user has devices with windings such as compressors of electric motors. These conditions can be corrected by the introduction of the opposite circuitry through virtual switching operations. In this embodiment, the data gathered regarding capacitive or inductive load is compared to existing data, the results being compared to ranges for possible recommendations, and then either taking action and displaying a recommendation on a display unit or making a recommendation of what action to take on the display unit. In some embodiments, the method may result in a recommendation of allowing the system to perform a corrective action with the user being able to respond via the input by selecting options such as: always yes, yes this time, no this time, or no always.

In some embodiments of the electrical system monitoring and control device the computer can take emergency action in response to sensor data before determining recommendations such as shutting off power to a circuit. Some examples of an emergency situation would be a fault to ground, over amperage (excessive current being drawn that creates an overheating threat in the conductor which could result in a fire). In these types of emergency situations the computer can disable power to the circuit via the electronic switching circuitry, or turn on or off a high voltage circuit or device, or take any other action which would be obvious to one of ordinary skill in the art.

Figure 5:
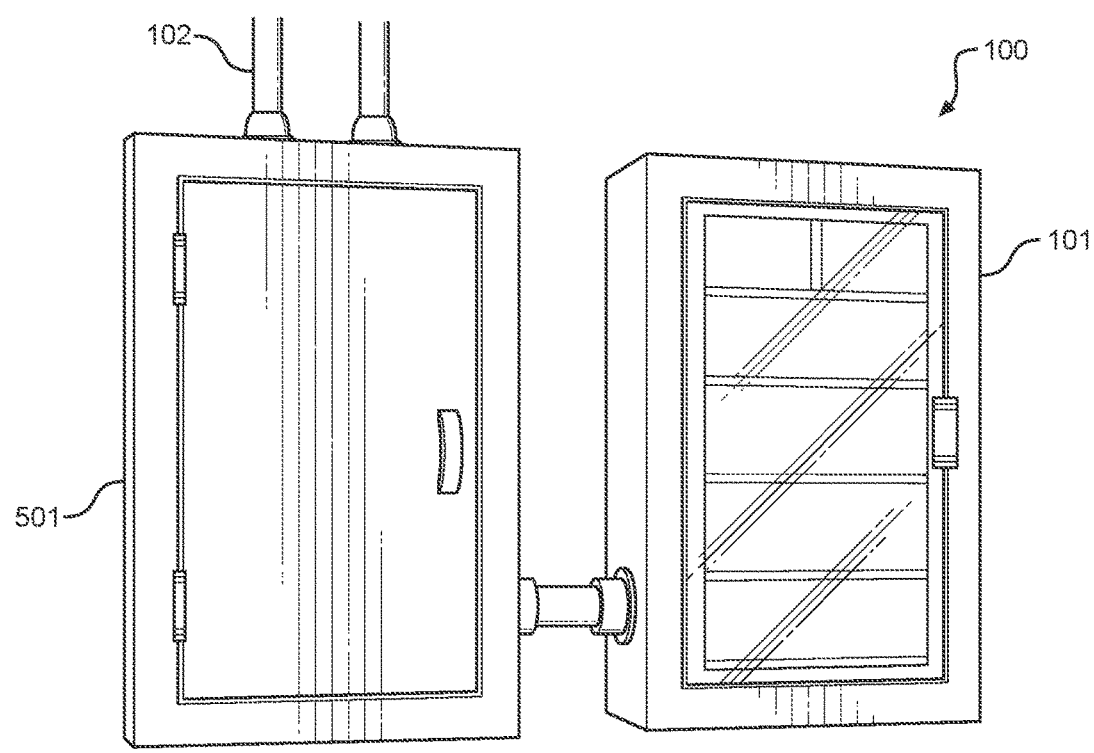
FIG. 5 shows a perspective view of a second embodiment of the electrical system monitoring and control device.

Referring now to FIG. 5, there is shown a perspective view of a second embodiment of the electrical system monitoring and control device. In this embodiment, the control unit 101 is a separate unit installed onto and in addition to an existing circuit breaker 501. The control unit 101 connects via wiring to the existing circuit breaker 501 in order to access the individual circuits of the electrical system of a building 102. In this embodiment, the wiring would be extensions of the individual circuits passing through the existing circuit breaker 501 to the control unit 101 and back out to the existing circuit breaker 501. In this embodiment, there is effectively a manual override for the control unit 101.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electrical system monitoring and control device, comprising:
   a control unit configured to attach to an electrical system of a building;
   the control unit comprising a display unit and an input;
   a sensor configured to operably connect to a circuit within the electrical system;
   the display unit is adapted to display each circuit in the electrical system and a status for each circuit;
   the input operably connected to the display, wherein the input serves as a user interface;
   a logic that is at least partially stored in a non-transitory computer readable medium and that, when executed at least in part by a processor, causes the electrical system monitoring and control device to perform a method, the method comprising:
   detecting a measurable characteristic of the electrical system by the sensor at a pre-determined interval;
   recording and storing a measurement of the measurable characteristic for each circuit on a memory unit;
   comparing the measurement of the measurable characteristic stored on the memory unit to a pre-determined range of measurements of the measurable characteristic of an ideal default electrical carrier wave stored on the memory unit;
   making a recommendation if the measurement of the characteristic is outside the pre-determined range for that characteristic;
   communicating the recommendation to the display unit, wherein the display unit displays the recommendation thereon;
   comparing the measurement of the measurable characteristic stored on the memory unit to the pre-determined range of measurements of the measurable characteristic of an ideal default electrical carrier wave stored on the memory unit, and previous measurements of the measurable characteristic;
   initiating an addition of an electrical device to the circuit via the input;
   assigning an identifier to the electrical device via the input;
   triggering a detection period lasting for a pre-determined period of time on the circuit via the input;
   detecting each measurable characteristic of the electrical system by the sensor at a pre-determined interval during the detection period;
   recording and storing the measurable characteristic on the memory unit;
   calculating a difference between a first measurement of the measurable characteristic of the circuit and a second measurement of the measurable characteristic, wherein the first measurement of the measurable characteristic was a last measurement of the measurable characteristic taken before the detection period, and the second measurement of the measurable characteristic is an average of stored values of the measurable characteristic detected during the detection period;
   assigning the average difference to the identifier on the memory unit;
   repeating the detecting, the recording, the comparing, the making a recommendation, the communicating steps, respectively.

2. The electrical system monitoring and control device of claim 1, further comprising: an electronic switching circuitry operably connected to each circuit for supplying electricity thereto.

3. The electrical system monitoring and control device of claim 1, further comprising:
   A transceiver operably connected to the control unit and adapted to allow two-way communication between a remote device and the control unit.

4. The electrical system monitoring and control device of claim 1, wherein the input is a touchscreen.

5. The electrical system monitoring and control device of claim 1, wherein the method further comprises:
   breaking the circuit when the sensor detects a fault condition.

6. The electrical system monitoring and control device of claim 1, wherein a measurable characteristic detected by the sensor is voltage.

7. The electrical system monitoring and control device of claim 1, wherein a measurable characteristic detected by the sensor is amperage.

8. The electrical system monitoring and control device of claim 1, wherein a measurable characteristic detected by the sensor is a wave shape of a sensed current.

9. The electrical system monitoring and control device of claim 1, wherein a measurable characteristic detected by the sensor is wattage.

10. The electrical system monitoring and control device of claim 1, wherein a measurable characteristic detected by the sensor is temperature.

11. A method for making recommendations regarding an electrical system of a building, comprising:
- detecting a measurable characteristic of the electrical system by the sensor at a pre-determined interval;
- recording and storing a measurement of the measurable characteristic for each circuit on a memory unit;
- comparing the measurement of the measurable characteristic stored on the memory unit to a pre-determined range of measurements of the measurable characteristic of an ideal default electrical carrier wave stored on the memory unit;
- making a recommendation if the measurement of the characteristic is outside the pre-determined range for that characteristic;
- communicating the recommendation to the display unit, wherein the display unit displays the recommendation thereon;
- initiating an addition of an electrical device to the circuit via the input;
- assigning an identifier to the electrical device via the input;
- triggering a detection period lasting for a pre-determined period of time on the circuit via the input;
- detecting each measurable characteristic of the electrical system by the sensor at a pre-determined interval during the detection period;
- recording and storing the measurable characteristic on the memory unit;
- calculating a difference between a first measurement of the measurable characteristic of the circuit and a second measurement of the measurable characteristic, wherein the first measurement of the measurable characteristic was a last measurement of the measurable characteristic taken before the detection period, and the second measurement of the measurable characteristic is an average of stored values of the measurable characteristic detected during the detection period;
- assigning the average difference to the identifier on the memory unit;
- repeating the detecting, the recording, the comparing, the making a recommendation, the communicating steps, respectively.

* * * * *